United States Patent [19]
Newman

[11] 3,753,000
[45] Aug. 14, 1973

[54] RECHARGEABLE LIGHTING SYSTEM FOR BICYCLES AND THE LIKE

[76] Inventor: James J. Newman, P.O. Drawer 579, Palm Desert, Calif. 92260

[22] Filed: Mar. 9, 1972

[21] Appl. No.: 233,119

[52] U.S. Cl............................ 307/9, 307/66, 240/7.6, 315/78
[51] Int. Cl............................ H02g 3/00, H02j 7/00
[58] Field of Search.................. 307/9, 10 R, 10 LS, 307/66, 150; 322/1; 240/7.6; 315/76, 78

[56] References Cited
UNITED STATES PATENTS

| | | | |
|---|---|---|---|
| 3,573,483 | 4/1971 | White | 307/66 |
| 2,299,762 | 10/1942 | McDermott | 315/78 |
| 3,443,115 | 5/1969 | Timmerman, Jr. | 307/66 |

Primary Examiner—Herman J. Hohauser
Attorney—Stuart R. Peterson

[57] ABSTRACT

A plastic housing or casing contains a generator, diode, battery and a miniature jack for connection to the head and tail lights of a bicycle or motor bike. By means of a curved resilient strip or plate attached to the front fork of the bicycle a drive cone on the projecting end of the generator shaft is biased against the rim of the bicycle's front wheel. Two normally closed contacts in the jack connect the generator and diode through a current limiting resistor to the battery composed of two serially connected nickel-cadmium cells so that when the generator is rotated at a sufficient speed by the rim of the wheel, the battery is charged; when the wheel speed is too low, and the generator then not furnishing a sufficient charging voltage, the diode prevents the battery from discharging. When the two lamps, that is the head light and tail light, are to be lighted, the user inserts a plug connected to these two lamps into the jack to establish an electrical path directly from the diode to the lamps via the plug. The plug connection also establishes a parallel connection with the battery to assure energization of the lamps at low wheel speeds when there is an insufficient charging voltage or when the bicycle is completely stopped and the generator not providing any voltage at all.

15 Claims, 5 Drawing Figures

PATENTED AUG 14 1973  3,753,000

RECHARGEABLE LIGHTING SYSTEM FOR BICYCLES AND THE LIKE

BACKGROUND OF THE INVENTION

1. Field of the Invention

This invention relates generally to lighting systems for bicycles and the like, and pertains more particularly to a rechargeable lighting system for bicycles, motor bikes and other vehicles where the generator is driven directly from one of the wheels, and in which the speed of the wheel and thus the speed of the generator varies considerably.

2. Description of the Prior Art

The use of a generator and a battery in association with a bicycle can be traced from before the turn of the century. In this regard, attention is directed to U.S. Pat. No. 583,945. However, no provision is made in this patent for preventing the battery from discharging when the generator is not operating at a sufficient speed. The problem has been recognized, however, in U.S. Pat. No. 2,299,762, for a governor is disclosed in this particular patent which automatically switches the battery in and out of the lighting circuit depending upon the speed of the bicycle. U.S. Pat. No. 2,488,021 contemplates the use of a cut-out, together with an ammeter. The purpose of the ammeter in this last-mentioned patent is to indicate when the battery is being either charged or discharged. When the ammeter signifies that a discharge of the battery is occurring, the bicyclist is informed that the cut-out should be operated into a disconnect position. The patentee also contemplates the use of an automatically operated cut-out, but remains silent as to the particular type of automatic cut-out that might be employed.

SUMMARY OF THE INVENTION

One important object of the invention is to provide an exceedingly simple system for charging and recharging batteries from a generator that varies quite widely as to its speed. More specifically, an aim of the invention is to drive the generator from the rim of a bicycle wheel and concomitantly charge the battery through a diode so that the forward bias of the diode, due to a sufficient charging voltage, causes the generator to charge the battery, yet when there is an insufficient charging voltage the reverse bias of the diode prevents any discharging of the battery.

Another object of the invention is to avoid using costly devices to prevent a battery discharge. In this regard, the previous teaching that a governor be employed necessitates using a rather costly device and one which is apt to get out of order quite readily, and also which requires careful adjustment in order to obtain an optimum charging condition. Also, the present invention obviates the need for any meter to signify when a discharge is occurring and which in the case of a manual cut-out device would require a specific manipulation to be performed by the cyclist.

Another object is to provide a lighting system in which the amount of charging current is limited when the bicycle's lights are off or deenergized, thereby avoiding any overcharging of the battery, yet which will supply an increased amount of current to both the head and tail lights when these lamps are energized. More specifically, an aim of the invention is to provide a switch mechanism in the form of a plug and jack in which the plug is inserted into the jack to connect the head light and tial light in circuit with the generator and simultaneously to by-pass or shunt the limiting resistor when the lamps are disconnected.

Yet another object of the invention is to provide a rechargeable lighting system that will operate normally to charge the battery and which will draw current directly from the generator when the head and tail lights are needed but which will automatically draw current from the battery when the generator is operating at too low a speed or stopped, as is frequently the case with bicycles and motor bikes.

Still further, an object is to provide an exceedingly compact and lightweight unit containing all of the essential components which can be readily mounted on any conventional bicycle or motor bike, there being a resilient strip or plate that biases the drive cone against the wheel rim. Also, it is within the purview of the invention to utilize the proper diameter portion of the drive cone, which has a tapered surface, for the particular size of bicycle wheel, the entire unit being adjustable upwardly or downwardly so that the cone bears against the rim at the proper location for the rim size. Thus, where the wheel is relatively small, say, a 20 inch wheel, then the drive cone would engage the rim thereof nearer the tip or small end of the cone, whereas if the wheel is larger, say, a 26 inch wheel, then the cone would be positioned so that a larger diameter portion thereof would contact the rim.

Still another object of the invention is to provide a self-contained system for use on bicycles which will withstand relatively rough usage and which will not be apt to get out of order readily, or require any appreciable degree of attention, to maintain the system in an operable condition.

Briefly, my invention comprises a plastic housing or casing which contains a generator having a projecting shaft which carries thereon a drive cone for engaging the rim of a bicycle wheel. The generator supplies current through a diode to a battery composed of two nickel-cadmium cells arranged in series. A resistor normally limits the amount of charging current delivered to the battery. However, when the bicycle's lights are to be energized, a plug is inserted into a jack located in the housing or casing which opens two normally closed contacts to deenergize the charging circuit. Simultaneously, the insertion of the plug into the jack provides a direct electrical path from the diode through the lamps and also provides a parallel connection to the battery so that when the speed of the generator is too low to provide the requisite charging voltage, the power to the lights is supplied from the battery, the battery supplying such energizing power also when the bicycle is standing still.

DESCRIPTION OF THE PREFERRED EMBODIMENT

Figure 1:
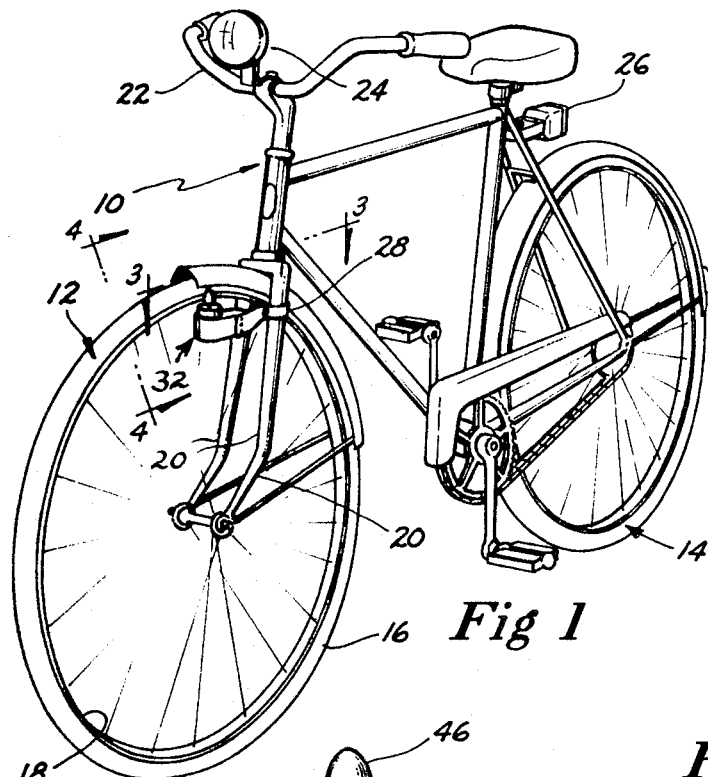
FIG. 1 is a side perspective view of a bicycle equipped with my lighting system.
Figure 4:
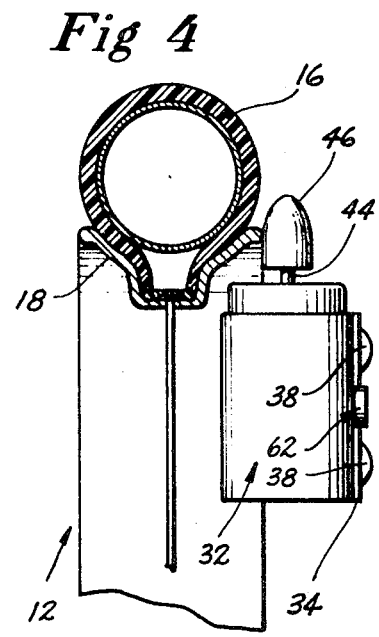
FIG. 4 is a vertical sectional view taken in the direction of line 4—4 of FIG. 1, the view being on an enlarged scale so as to show to better advantage the manner in which the drive cone on the generator shaft engages the rim of the front wheel of the bicycle pictured in FIG. 1.
Figure 2:
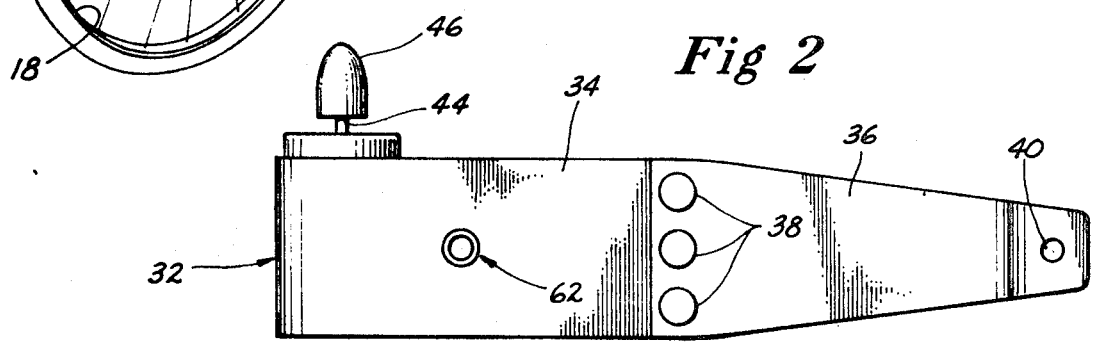
FIG. 2 is an enlarged elevational view of the generator and battery unit apperaing in FIG. 1.
Figure 3:
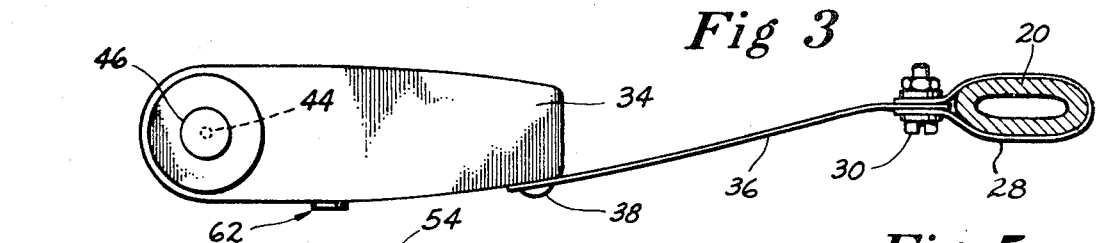
FIG. 3 is a top plan view of the unit, the view being taken in the direction of line 3—3 of FIG. 1.

Although of conventional construction, a bicycle 10 has been pictured in FIG. 1. While the invention will be described in conjunction with a bicycle, it will be appreciated that the invention will find utility in association with motor bikes and other vehicles where only a wheel drive is relied upon for operating or rotating a generator. Describing now the bicycle 10 in greater detail so that the benefits of the present invention can be fully realized, it will be seen that the bicycle 10 includes a front wheel 12 and a rear wheel 14. The front wheel 12 comprises a tire 16 and a rim 18. Specific reference is made to the tire 16 and rim 18 because it is planned that the rim 18 be used and thereby avoid unnecessary tire wear.

Continuing the description of the bicycle 10, it has a front fork 20 and handle bars 22 at the top thereof. Normally, the head light 24 is mounted on the handle bars 22 and such is the situation in the view now being described. Additionally, the bicycle 10 has a tail light 26.

In order to mount the unit yet to be referred to, a fork clamp 28 of conventional construction is attached to one of the fork tines. The fork clamp 28 has a transverse mounting bolt 30.

Having described the bicycle 10 to the extent that has been done above, it is thought that my invention will now be better understood. In this regard, attention is directed to a rechargeable unit denoted generally by the reference numeral 32. The unit 32 comprises a plastic housing or casing 34. A resilient strip or plate 36 functions as a leaf spring, serving to attach the plastic casing 34 to the fork clamp 28. A plurality of fasteners, such as drive screws or rivets 38 attach one end of the strip or plate 36 to the casing 34. The other end of the strip or plate 36 has a hole 40 therein. Through the hole 40 extends the mounting bolt 30, the fork clamp 28 pressing against both sides of the strip or plate 36 in the vicinity of the hole 40 to maintain the strip or plate 36 in place. Additionally, the clamp 28 can be twisted angularly to adjust the bias provided by the member 36 as will be better understood as the description progresses.

The unit 32 further includes a generator 42, the generator 42 being for the most part contained fully within the casing 34. However, the generator 42 has a projecting shaft 44 and on the free end of the shaft 44 is a drive cone 46. It can be mentioned that the drive cone 46 is preferably composed of conductive neoprene so as to avoid any static build-up. While other generators can be utilized, one generator found especially satisfactory for incorporation into the unit 32 is a Marx DC motor which is imported and distributed by the Newman Company, Post Office Box 494, Rancho Mirage, Calif. 92270. This particular motor is further identified by catalog number 130 and functions admirably as a generator by reason of its specific construction. It might also be mentioned that the weight of this item is only 2.48 ounces yet it is capable of easily generating 2.0 amperes at voltages up to 6.0 volts. These devices are also quite small, having a length of only 3.85 centimeters and a diameter of only 3.0 centimeters.

Inasmuch as it is not deemed necessary to show the physical layout of the various components contained within the casing 34, considerable reliance will be made on the schematic diagram appearing in FIG. 5. It will be discerned that the generator 42 has been illustrated in FIG. 5 having its positive output terminal identified by the reference numeral 48 and its negative output terminal by the reference numeral 50. The negative terminal 50 of the generator 42 has been grounded at 52. This is easily achieved in practice by simply connecting a wire from the generator to its casing. In order to provide a smooth or unrippled voltage output, a capacitor 54 is connected between the positive terminal 48 and the negative terminal 50, any objectionable voltage fluctuations being smoothed out by virtue of the provided capacitance.

Figure 5:
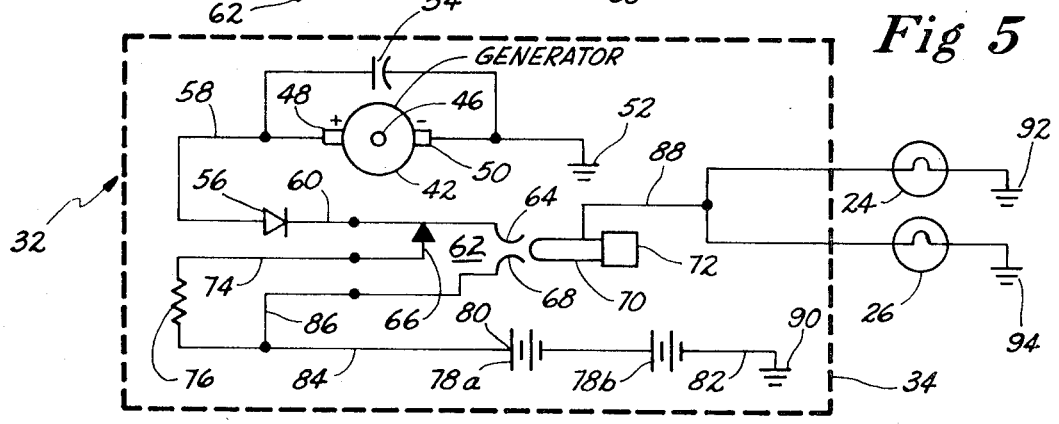
FIG. 5 is an electrical schematic diagram which includes the head and tail lights shown in FIG. 1 plus the components contained in the plastic casing attached to the front fork in FIG. 1.

Continuing with the description of FIG. 5, it will be perceived that a diode 56 has its anode connected by a conductor 58 to the positive terminal 48 of the generator 42. A conductor 60 extends from the cathode of the diode 56 to a miniature phone-type jack 62.

Although the jack 62 is of conventional construction, having been used rather widely in telephone and high fidelity sound applications, nontheless a specific description thereof will be of some assitance. In this regard, the conductor 60 connects directly with a contact 64 that is normally engaged with a second contact 66. The jack 62 further includes a transfer contact 68. More will be said presently concerning the connections of the contacts 66 and 68 in the circuit of FIG. 5. At this time, though, attention is directed to a plug 70 having a handle 72. Here again, more will be said below concerning the role played by the plug 70.

The contact 66 which is normally engaged with the contact 54 has a conductor 74 extending therefrom to a current limiting resistor labeled 76. The function of the resistor 76 is to limit the amount of charging current supplied to a battery composed of two nickel-cadmium cells 78a, 78b, these cells, as is evident from FIG. 5, being connected in series with each other. Typically, each cell will provide a voltage of 1.25 volts. For the sake of facile description, the battery comprising the nickel-cadmium cells 78a and 78b has a positive terminal 80 and a negative terminal 82. The serially connected cells thus provide 2.50 volts between these terminals 80, 82. A conductor 84 connects the current limiting resistor 76 to the terminal 80. A conductor 86 also extends from the terminal 80 to the previously mentioned transfer contact 68 of the jack 62. Still another conductor 88 connects the plug 70 to the earlier-mentioned head light 24 and the tail light 26, these two lamps being connected in parallel.

It will be observed that the terminal 82 of the battery composed of the cells 78a and 78b is grounded at 90. Similarly, the head lamp or head light 24 is grounded at 92 and the tail light 26 grounded at 94. The various grounds alluded to are simply a common metallic path furnished largely by the frame of the bicycle 10. Stated somewhat differently, by utilizing grounded connections as described above, only a single wire system is needed.

OPERATION

From the information given herein, it is thought that the benefits to be derived from a practicing of my invention will be recognized. Nonetheless, to assure a full comprehension of the benefits to be gained a brief operational description will be presented. In this regard, it will be understood that my rechargeable unit 32 is attached to the fork 20 by means of the clamp 28. Care must be exercised to attach the unit 32 at the proper elevation so that the drive cone 46 bears against the rim 18 of the wheel 12 at the correct location thereon for the particular size of wheel. If the wheel is smaller, then the upper end or tip of the drive cone 46 will be selected, whereas the converse is true if the wheel is larger. Also, when mounting my unit 32, the fork clamp 28 should hold the resilient strip or plate 36 at the proper angle so as to provide the proper biasing force. In other words, the fork clamp 28 can be twisted or rotated on the particular fork element so as to cause more or less biasing action to be provided by the curved strip or plate 36. Once the fork clamp 28 has been tightened in place, then the strip or plate 36, which functions as a leaf spring, should exert the proper amount of pressural action in the direction of the rim 18 to cause the cone 46 to bear thereagainst without slippage. It will be noted, though, that the need for any torsion springs is avoided. With the unit 32 properly mounted, then no further attention is required from the user. Whenever the wheel 12 is rotated, the rim 18 simply causes the generator shaft 44 to rotate, doing so via the cone 46.

Rotation of the generator causes it to generate a voltage having a magnitude or value in accordance with the speed of the wheel 12. If the wheel 12 is rotating at a relatively low speed, then the output voltage from the generator 42 will be relatively low.

Assuming that the generator 42 is being driven at a speed sufficient to produce a voltage high enough to charge the battery composed of the two cells 78a and 78b, then it will be noted that the resistor 76 limits the amount of charging current to a safe value. Battery manufacturers will normally furnish data indicating the proper charging rate; for the sake of discussion, it will be assumed that the charging rate in this instance should be limited to 100 milliamperes. Thus, the resistance, typically 35 ohms, of the resistor 76 will simply be selected so as to limit the charging rate to this current value for the maximum voltage that can be expected from the generator 42. The maximum voltage will in turn depend upon the greatest number of revolutions per minute that could logically be expected when operating a bicycle having a given wheel size at its fastest practical speed.

It will be discerned from FIG. 5 that the contacts 64, 66 of the jack 62 are normally closed when the plug 70 has not been inserted into the jack. It will also be perceived from FIG. 5 that the contact 68 is open and that it is ineffectual at this time.

Assuming now that the lamps 24 and 26 are to be energized, the user simply inserts the plug 70 into the jack 62. The insertion of the plug 70 bears against the underside of contact 64 to raise it slightly, thereby disengaging it from the underlying contact 66 and at the same time to cause the circuit between the diode 50 and the resistor 76 to be interrupted or broken.

Concurrently, though, the plug 70, owing to its engagement with the contact 64 connects the diode 50 directly to the lamps 24 and 26. Also, the plug 70 engages the normally open contact 68 to provide an electrical path from the positive terminal 80 of the battery composed of the cells 78a and 78b so that if the voltage supplied from the generator 42 through the diode 50 is insufficient, then the battery 78a, 78b automatically furnishes the energizing current for the lamps 24 and 26.

It should be distinctly understood that the diode 50, owing to its rectifying capability, will not allow current to flow in a reverse direction therethrough. In other words, when the generator 42 is operating at a relatively low speed, as it will when the wheel 122 is rotating at a relatively low speed, it is generating an insufficient voltage to cause a charging of the battery 78a, 78b. In other words, the reverse bias of the diode 50 prevents any flow of current back through the diode to the generator 42. Such a flow of current in a reverse direction would tend to run the generator 42 as a motor, imposing a serious and unwanted load on the battery 78a, 78b, which would undesirably cause its discharge if permitted. On the other hand, even when the bicycle 10 is stationary and the generator 42 not rotating at all, the battery 78a, 78b will under these conditions supply current to the lamps 24, 26 over the conductor 86, through the transfer contact 68, the plug 70 and the conductor 88 leading to the two lamps.

Consequently, when practicing the teachings of my invention one does not have to pay any attention to whether the generator 42 is providing a charging current or not. If it is not, and the lamps 24 and 26 are connected into the circuit through the agency of the plug 70, then the battery 78a, 78b supplies the energizing power. On the other hand, when the generator 42 is generating a sufficient voltage the current derived therefrom will flow through the rectifier constituting the diode 50, the resistor 76 and the battery 78a, 78b, and no current is taken from the battery.

I claim:

1. A rechargeable lighting system for bicycles and the like comprising a generator driven at various speeds by a wheel of a bicycle, said generator having a pair of output terminals, a rectifier connected to one terminal of said generator, a rechargeable battery connected between said rectifier and the other terminal of said generator, and means for connecting an electric lamp to a location between said rectifier and said battery and to said other terminal.

2. The system defined in claim 1 including a current limiting resistor, and in which said last-mentioned means includes a switch at said location for establishing a parallel relationship between said electric lamp and said battery in one position thereof and conecting only said resistor between said rectifier and battery in a second position thereof.

3. A rechargeable lighting system for bicycles and the like comprising a generator driven at various speeds by a wheel of a bicycle, said generator having a pair of output terminals, a diode connected to one terminal of said generator, a rechargeable battery connected between said rectifier and the other terminal of said generator, a current limiting resistor, and a switch for establishing a parallel relationship between said electric lamp and said battery in one position thereof and connecting only said resistor between said diode and battery in a second position thereof, said switch constituting a jack and plug having first and second normally closed contacts, said first contact being connected to said diode and said second contact to said resistor, and said jack having a third normally open contact connected to a location between said resistor and battery, said plug being insertable into said jack to open said first and second contacts and at the same time provide an electrical connection between said first and third contacts.

4. The system defined in claim 3 in which said battery includes two serially connected nickel-cadmium cells.

5. The system defined in claim 4 in which said lamp constitutes a head light.

6. The system defined in claim 5 including a tail light in parallel with said head light, said plug being connected to said tail light in addition to being connected to said head light.

7. The system defined in claim 1 including a casing, said generator, rectifier and battery being housed in said casing and said generator having a shaft projecting therefrom, and a drive element on the projecting end of said shaft engageable with the rim of a bicycle wheel.

8. The system defined in claim 7 including a resilient strip extending from said casing for resiliently urging said casing in a direction to cause said drive element to engage said rim.

9. The system defined in claim 8 in which said drive element constitutes a cone.

10. The system defined in claim 9 including a vertically adjustable clamp for supporting one end of said resilient strip to position a desired diameter portion of said cone against said rim.

11. A rechargeable lighting system for bicycles and the like comprising a generator engageable with a wheel of a bicycle so as to be rotated at various speeds dependent upon the speed of rotation of said bicycle wheel, said generator having a pair of output conductors, a diode connected to one output conductor of said generator, a rechargeable battery having one side thereof connected to the other output conductor of said generator, a current limiting resistor, means connecting said resistor between said diode and the other side of said battery, a head light, means connecting said head light between said diode and said other side of the battery when said resistor is disconnected, said last-mentioned means also connecting said lamp in parallel with said battery, whereby when said generator is rotating at a sufficient speed current flows from said generator through said head light and when said generator is rotating at an insufficient speed said head light is energized from said battery.

12. The system defined in claim 11 in which said two means constitute a switch, said switch having one position in which said resistor is connected between said diode and battery and a second position in which said head light is connected between said diode and said other output conductor of the generator and also in parallel with said battery.

13. The system defined in claim 12 in which said battery includes two nickel-cadmium cells connected in series.

14. The system defined in claim 13 including a capacitor connected between said first output conductor of the generator and the second side thereof.

15. The system defined in claim 1 in which said connecting means includes a pair of normally open switch contacts at said location, one of said contacts being connected to the side of said rectifier remote from the side thereof connected to said one generator terminal and the other of said contacts being connected to the side of the battery remote from the side thereof connected to said other generator terminal and means for closing said switch contacts to connect said rectifier to said battery and to connect both of said contacts to said electric lamp, whereby when said normally open contacts are closed by said last-mentioned means an electrically conductive path is provided from said rectifier through said lamp to said other generator terminal and also from said battery through said lamp to said other generator terminal.

* * * * *